United States Patent [19]

Okamoto et al.

[11] Patent Number: 4,475,052

[45] Date of Patent: Oct. 2, 1984

[54] AIR GAP WINDING ROTATING ELECTRIC MACHINE

[75] Inventors: Kouichi Okamoto; Toshiki Hirao, both of Kobe; Tatsuei Nomura, Itami, all of Japan

[73] Assignee: Mitsubishi Denki Kabushiki Kaisha, Tokyo, Japan

[21] Appl. No.: 472,124

[22] Filed: Mar. 4, 1983

[30] Foreign Application Priority Data

Mar. 8, 1982 [JP] Japan .................................. 57-37669
Mar. 8, 1982 [JP] Japan .................................. 57-37670

[51] Int. Cl.³ .............................................. H02K 3/48
[52] U.S. Cl. ..................................... 310/214; 310/45; 310/179
[58] Field of Search ............... 310/214, 179, 194, 180, 310/216, 217, 254, 258, 43, 45, 256

[56] References Cited

U.S. PATENT DOCUMENTS

| 3,082,337 | 3/1963 | Horsley | 310/179 |
| 3,777,197 | 12/1973 | Preston | 310/254 |
| 4,179,635 | 12/1979 | Beermann | 310/214 |
| 4,228,375 | 10/1980 | Beermann | 310/179 |
| 4,375,043 | 2/1983 | Roger | 310/214 |

FOREIGN PATENT DOCUMENTS

| 52-93903 | 8/1977 | Japan | 310/179 |
| 54-67607 | 5/1979 | Japan | 310/179 |
| 486424 | 1/1976 | U.S.S.R. | 310/179 |

Primary Examiner—R. Skudy
Attorney, Agent, or Firm—Wenderoth, Lind & Ponack

[57] ABSTRACT

The present invention is an air gap winding rotating electric machine in which the stator coils are disposed between the stator side magnetic shield and a thin-walled electrically insulating cylinder which surrounds the rotor. The stator coils are prevented from lateral movement by electrically insulating members inserted between adjacent sets of stator coils. In presently existing air gap winding rotating electric machines, these insulating members fit into slots in the magnetic shield; they are difficult to install and frequently become loose, resulting in the loosening of and possibly damage to the stator coils. In the present invention, the magnetic shield has inward projections instead of slots, and insulating members are secured by the use of taper keys, with the result that installation of the insulating members is easy and there is less chance of their coming loose than in presently existing machines, resulting in a more reliable installation of the stator coils.

8 Claims, 8 Drawing Figures

AIR GAP WINDING ROTATING ELECTRIC MACHINE

BACKGROUND OF THE INVENTION

1. Field of the Invention

This invention relates to rotating electric machines, and in particular to an air gap winding rotating electric machine in which the stator coils are rigidly and reliably disposed on the stator side.

2. Description of the Prior Art

In recent years, air gap winding rotating electric machines have become increasingly common. The main feature of this type of machine is that the stator coils are disposed in the space (i.e. the air gap) between the stator core and the rotor. In addition to making efficient use of space, placing the coil windings in the air gap has the advantage that the magnetic flux density of the stator coils is greatly increased, thereby increasing the capacity of the machine. Disposition of the coil windings in the air gap is particularly advantageous in large capacity and superconducting rotating electric machines.

However, air gap winding rotating electric machines have the drawback that reliably securing the stator coils in the air gap is difficult.

One method used in the prior art of attaching the stator coils to the stator core is to directly bond the two together with a high strength adhesive, but a bond strong enough to prevent loosening and vibration of the stator coils over long periods can not be achieved.

An air gap winding rotating electric machine of a presently existing type using a different method of disposing the stator coils is shown in FIGS. 1 and 2. FIG. 1 is a longitudinal cross-sectional view, and FIG. 2 is a cross-sectional view of the device of FIG. 1, taken along the line II—II of FIG. 1. In the figure, 1 is a stator side magnetic shield comprising a large number of metal (e.g. silicon steel) plates laminated to form a hollow cylinder disposed inside a stator frame (not shown in the figures). Numerals 2 indicate end plates restraining the end surfaces of the magnetic shield 1. Numeral 3 indicates a thin-walled electrically insulating cylinder coaxial with and substantially surrounding but not contacting a rotor 10. The insulating cylinder 3 is formed from a material of high strength, high resistance to heat, and good electrical insulating properties such as epoxy resin fiber glass or epoxy resin glass cloth. Numerals 4 indicate sets of stator coils disposed about the outer circumference of the insulating cylinder 3, each set comprising an upper group 4a and a lower group 4b separated by an axially extending electrically insulating plate 6. Between adjacent groups of stator coils 4 are first electrically insulating members 7 and second electrically insulating members 8. Each of the second electrically insulating members 8 is formed with a outward radial projection 8a extending for its entire axial length, which fits into an axially extending slot 1a formed in the inner circumferential surface of the magnetic shield 1. The first and second electrically insulating members are made of a material such as molded epoxy resin glass cloth. Numerals 5 indicate outer electrically insulating plates disposed about the outer circumference of the stator coils 4 and aligned parallel to the axis of the magnetic shield 1. Between the inner cylindrical surface of the magnetic shield 1 and the outer electrically insulating plates 5 are means for pressing the stator coils 4 against the thin-walled electrically insulating cylinder 3. In the device shown in FIGS. 1 and 2, these means comprise pairs of wedges 9 manually inserted from both axial ends of the magnetic shield 1. The wedges 9 are installed by driving them into place with a mallet until the stator coils 4 are rigidly secured by the force pressing them against the insulating cylinder 3. The wedges 9 are formed of an electrically insulating material of high strength such as epoxy resin glass cloth laminate.

During operation of an air gap winding rotating electric machine such as that shown in FIGS. 1 and 2, large lateral (i.e. in the circumferential direction) forces are exerted on the stator coils 4. These forces are partially borne by the second electrically insulating members 8. As shown in FIG. 2, lateral forces $W_1$ and $W_2$ are transmitted from the upper group of stator coils 4a and lower group of stator coils 4b, respectively, to the second electrically insulating members 8. These forces result in a torque about the base of the outward radial projection 8a.

This torque tends to loosen the connection between the outward radial projection 8a and the slot 1a into which it fits. Any looseness in this connection and any resulting movement of the second electrically insulating members 8 is of course undesirable, since it permits movement and vibration of the stator coils 4. Looseness of this connection may also result in damage to other parts of the rotating electric machine. If one of the second electrically insulating members 8 becomes loose, it will not be able to resist the lateral forces $W_1$ and $W_2$ exerted on it. Instead, these forces will be transferred to an adjacent second electrically insulating member 8 which is not loose, and these added forces may cause the latter to break.

Further, if there is looseness in the connection between the slot 1a and the outward radial projection 8a, the second electrically insulating member 8 will tend to pivot about the outward radial projection 8a when lateral forces $W_1$ and $W_2$ are exerted on it. In this case, the inner surface (marked B in FIG. 2) of the second electrically insulating member 8 will exert considerable force on the insulating cylinder 3, causing it to bulge inwards towards the rotor 10 and perhaps causing local failure of the insulating cylinder 3.

For these reasons, it is very important that the outward radial projection 8a tightly fits into the slots 1a in the magnetic shield 1. There must be no gaps between the sides of the outward radial projection 8a and the slots 1a.

However, a perfect fit between these two members is very difficult to achieve. Both the outward radial projections 8a and the slots 1a must be carefully manufactured in order to obtain a good fit, making manufacture costly and time consuming. Further, in the device shown in FIGS. 1 and 2, there is no means for tightening the connection between the outward radial projection 8a and the slot 1a if at some time after assembly the second electrically insulating member 8 becomes loose. Clearly, an air gap winding rotating electric machine of the type shown in FIGS. 1 and 2 is not fully satisfactory in regards to the means used for securing the stator coils 4 to the stator.

SUMMARY OF THE INVENTION

It is the object of the present invention to provide an air gap winding rotating electric machine in which the stator coils can be rigidly and reliably secured to the stator side over long periods without loosening.

It is another object of the present invention to provide an air gap winding rotating electric machine in which the torque exerted on the second electrically insulating members disposed between groups of stator coils is reduced, thereby decreasing the possibility of loosening or failure of the second electrically insulating members.

It is a further object of the present invention to provide an air gap winding rotating electric machine in which the second electrically insulating members can be easily retightened if at some time during use they become loose.

In the present invention, the magnetic shield is formed with inward radial projections instead of slots. Each of the second electrically insulating members is formed with an outward radial projection. One side of each outward radial projection is separated by a small space from one side of each inward radial projection, and taper keys are inserted into the space so as to rigidly secure the second electrically insulating member, thus rigidly securing the stator coils. Because of the geometry of the present invention, the torque exerted on the insulating member is reduced, and there is less tendency for the second electrically insulating members to come loose.

DESCRIPTION OF THE PREFERRED EMBODIMENTS

Figure 1:
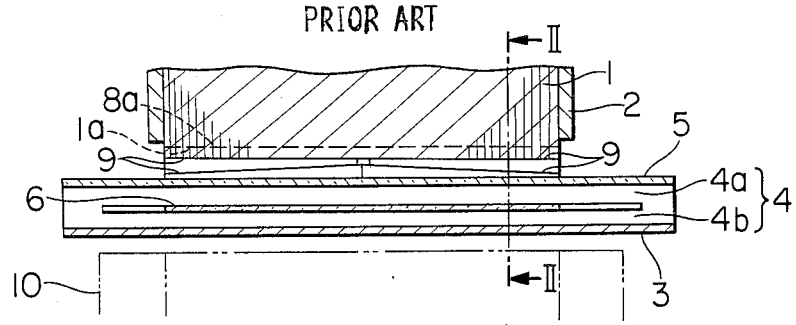
FIG. 1 is a longitudinal cross-sectional profile of an air gap winding rotating electric machine of a type used hitherto.

A first embodiment of an air gap winding rotating electric machine according to the present invention will now be described while referring to FIGS. 3 and 4, in which reference numbers identical to those used in FIGS. 1 and 2, described earlier, refer to identical parts.

In the figures, 11 is a magnetic shield comprising a large number of metal plates (made of, for example, silicon steel) laminated to form a hollow cylinder disposed inside a stator frame (not shown). At a plurality of locations on the inner cylindrical surface of the magnetic shield 11, there are formed inward radial projections 11a which extend for the entire axial length of the magnetic shield 11. Numeral 12 indicates second electrically insulating members formed of, for example, molded epoxy resin glass cloth, disposed on the outer circumference of the thin-walled electrically insulating cylinder 3 between adjacent groups of stator coils 4. Each second electrically insulating member 12 has substantially the same axial length as the magnetic shield 11. An outward radial projection 12a is formed on each of the second electrically insulating members 12 extending for the entire length of the member. Each outward radial projection 12a fits into the space between one of the inward radial projections 11a and the closest pair of wedges 9.

Figure 5:
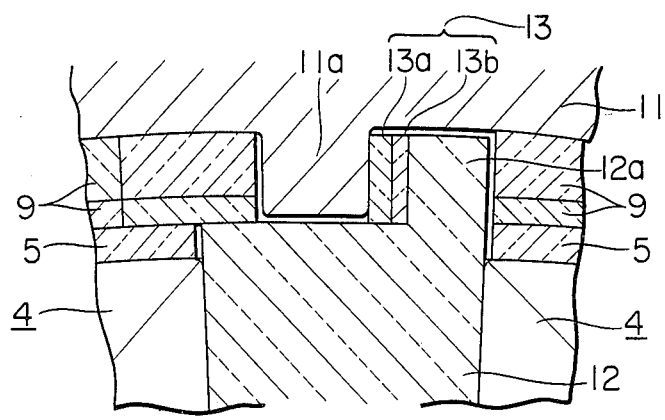
FIG. 5 is an enlarged view of a portion of FIG. 4, more clearly showing the disposition of taper keys.
Figure 6:
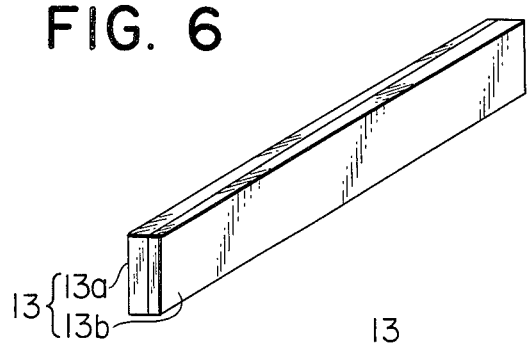
FIG. 6 is a perspective view of the taper keys employed in the embodiment of FIGS. 3 through 5.

As shown in FIG. 5, the outward radial projections 12a are not in direct contact with the inward radial projections 11a; the two are separated by a small space. Into each such space is inserted a pair of taper keys 13 having a length substantially equal to the length of the magnetic shield 11. Each pair of taper keys 13 consists of a first taper key 13a (in contact with the inward radial projection 11a) and a second taper key 13b (in contact with the wedges 9) of similar shape. When their surfaces are placed together, they form a rectangular prism, as shown in FIG. 6. They are made of a high strength electrically insulating material, such as epoxy resin glass cloth laminate. Their thickness is such that, when inserted, substantially no gaps are left on the sides of the outward radial projection 12a, thereby rigidly securing the latter between an inward radial projection 11a and the nearest wedges 9.

Figure 3:
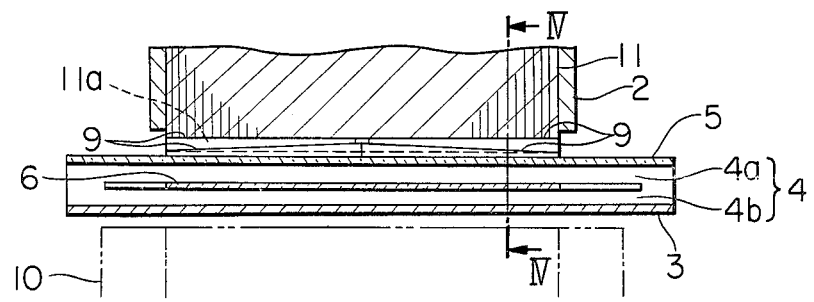
FIG. 3 is a longitudinal cross-sectional profile of one embodiment of an air gap winding rotating electric machine according to the present invention.
Figure 4:
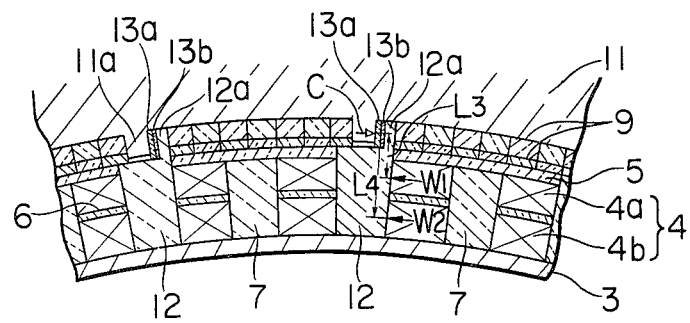
FIG. 4 is a cross-sectional view of the embodiment of FIG. 3, taken along line IV—IV of FIG. 3.

The assembly of the embodiment shown in FIGS. 3 through 5 is as follows. Sets of stator coils 4 are disposed about the outer circumference of the thin-walled electrically insulating cylinder 3. Into each set of stator coils 4, there is inserted an insulating plate 6 so as to divide it into an upper group 4a and a lower group 4b. Between adjacent sets of stator coils 4, there are inserted first electrically insulating members 7 and second electrically insulating members 12. About the outer circumference of the stator coils 4, there are laid the outer electrically insulating plates 5 so as to substantially cover both the stator coils 4 and the first electrically insulating members 7. The thus far assembled unit is then inserted into the cylindrical center of the magnetic shield 11 so that a small space is left between the sides of the inward radial projections 11a and the outward radial projections 12a. Using a mallet, the wedges 9 are driven into the space between the magnetic shield 11 and the outer electrically insulating plates 5 so as to firmly press the stator coils against the thin-walled electrically insulating cylinder 3. Lastly, the pairs of taper keys 13 are driven into the spaces between the inward radial projection 11a and the outward radial projections 12a, using a mallet.

In this manner, any gaps on either side of the outward radial projection 12a can be easily removed, ensuring a tight fit. Unlike the air gap winding rotating electric machine shown in FIGS. 1 and 2, the exact dimensions of the outward radial projection 12a are not critical in achieving a good fit. Since the taper keys 13 fill in any gaps on the side of the outward radial projection 12a, the projection may be manufactured to less strict tolerances.

During operation of the air gap winding rotating machine according to the present invention, lateral forces $W_1$ and $W_2$ are exerted on each of the second electrically insulating members by the upper group of stator coils 4a and the lower group of stator coils 4b, as shown in FIG. 4.

In the present invention, the resulting torque will be reacted at a point C on the inward radial projection 11a.

Figure 2:
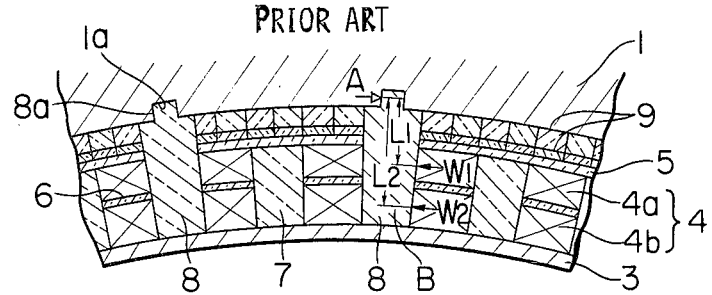
FIG. 2 is a cross-sectional view of the same rotating electric machine as in FIG. 1, taken along line II—II of FIG. 1.

In contrast, in the machine of FIGS. 1 and 2, the resulting torque is reacted at a point A on the slot 1a in the magnetic shield 1 as shown in FIG. 2. Point A is further from the points of application of the forces $W_1$ and $W_2$ of FIG. 2 than is point C from the points of application of the forces $W_1$ and $W_2$ of FIG. 4. Thus, $L_1$ and $L_2$ of FIG. 2 (the moment arms of $W_1$ and $W_2$, respectively) are greater than $L_3$ and $L_4$ of FIG. 4 (the moment arms of $W_1$ and $W_2$, respectively). If one compares two machines of equal size (in which case $W_1$ and $W_2$ of FIG. 2 equal $W_1$ and $W_2$ of FIG. 4), then the torque $W_1 \cdot L_3 + W_2 \cdot L_4$ on the second insulating member 12 of the present invention is clearly smaller than the torque $W_1 \cdot L_1 + W_2 \cdot L_2$ on the second insulating member 8 of FIG. 2, and the likelihood of the second insulating member 12 becoming loose is correspondingly reduced.

The surface of the magnetic shield 11 and its inward radial projections 11a is frequently uneven, due to the fact that the magnetic shield 11 is a laminate of a great number of metal plates whose end surfaces are not completely flush with one another; one plate may vary from being flush with the adjacent plate by as much as 0.3 mm. This misalignment produces a high coefficient of friction between the sides of the inward radial projections 11a and the first taper keys 13a with which they contact, and great force may be required to insert the first taper keys 13a, possibly resulting in damage to its outer ends when driving it into place with a mallet.

Figure 7:
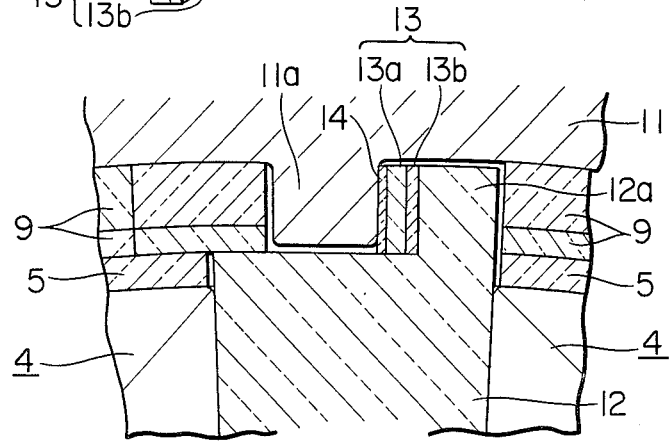
FIG. 7 is a cross-sectional view similar to FIG. 5 of a second embodiment of an air gap winding rotating electric machine according to the present invention, in which a protective sheet is applied to the side of the inward radial projection.

FIG. 7 shows a second embodiment of the present invention which overcomes this problem by the application of a thin protective sheet 14 to each inward radial projection 11a on the side facing one of the first taper keys 13a. The protective sheet 14 is made of a strong, electrically insulating material such as epoxy resin glass cloth laminate. By covering the rough surface of the inward radial projections 11a and providing a smooth surface against which the first taper keys 13a contact, the force required to insert the taper keys 13 is greatly reduced. The protective sheet 14 has the additional benefit of protecting the insulating varnish which is coated on the surface of the magnetic shield 11 and the inward radial projections 11a from damage which might result from direct contact with the first taper key 13a.

Figure 8:
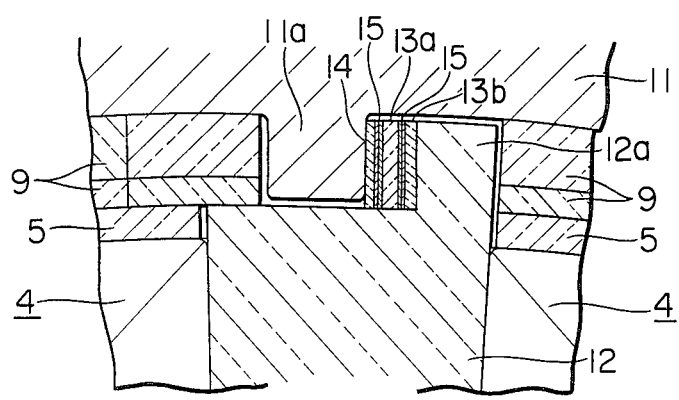
FIG. 8 is a cross-sectional view of a third embodiment according to the present invention employing a bearing liner.

As the axial length of an air gap winding rotating electric machine increases, the force required to insert the taper keys 13 increases accordingly. In a large machine, it may be desirable to further reduce the coefficient of friction between the taper keys 13 and surfaces against which they contact by the use of a low-friction bearing liner. Figure 8 shows a third embodiment of an air gap winding rotating electric machine according to the present invention in which a bearing liner 15 is applied between the protective sheet 14 and the first taper key 13a, and between the first taper key 13a and the second taper key 13b. The bearing liner 15 is made of a low-friction fluoroplastic, such as polytetrafluoroethylene (commercial name: Teflon). The bearing liner 15 reduces the coefficient of friction between contact surfaces to a very low value (approximately 0.05), so that even in a large machine, it is possible to drive the taper keys 13 into place without damage to the end surface of the first taper key 13a. It may be applied to either the protective sheet 14 or to the first taper key 13a or to both, and between the first taper key 13a and the second taper key 13b on either one or both of the taper keys 13. FIG. 7 shows the case where two sheets of bearing liner 15 are applied at each location, but the number may be varied as desired. Further, in the case where the surfaces of the inward radial projections 11a are relatively smooth, the projective sheet 14 and the bearing liner 15 may be dispensed with.

In the three embodiments described above, each pair of taper keys 13 extends for substantially the entire axial length of the magnetic shield 11. However, instead of using a single long pair of taper keys at each location, more than one pair of shorter taper keys may be inserted at each location so that the total length of all the pairs of taper keys inserted at a given location substantially equals the axial length of the magnetic shield 11.

Although in the embodiments described the number of first electrically insulating members 7 equals the number of second electrically insulating members 12, the relative number of each may be varied.

Further, in the above embodiments, the means for pressing the stator coils 4 against the thin-walled electrically insulating cylinder 3 comprise wedges 9, but any other appropriate means for accomplishing the same purpose may be used.

What is claimed is:

1. An air gap winding rotating electric machine comprising:
   a rotor;
   a magnetic shield comprising a plurality of metal plates laminated together to form a hollow cylinder having a plurality of inward radial projections on its inner circumferential surface, said magnetic shield disposed around and coaxial with said rotor;
   a thin-walled electrically insulating cylinder disposed between said rotor and said magnetic shield, substantially surrounding and parallel to but not in contact with said rotor;
   a plurality of sets of stator coils disposed about the outer circumference of said insulating cylinder;
   a plurality of outer electrically insulating plates disposed about the outer circumference of said stator coils;
   a plurality of electrically insulating members disposed about the outer circumference of said insulating cylinder between adjacent sets of stator coils;
   wherein said electrically insulating members include first electrically insulating members and second electrically insulating member, each of said second electrically insulating member being formed with an outward radial projection, and each of said second electrically insulating members being disposed so that one side of its outward radial projection is separated by a small space from one side of one of said inward radial projections of said magnetic shield; and
   means for pressing said stator coils against said insulating cylinder in the radial direction thereof, inserted between said outer electrically insulating plates and the inner circumferential surface of said magnetic shield.

2. An air gap winding rotating electric machine as claimed in claim 1, wherein said second electrically insulating members are made of molded epoxy resin glass cloth.

3. An air gap winding rotating electric machine as claimed in claim 2, further comprising a pair of taper keys inserted into each of said spaces between said inward radial projections of said magnetic shield and said outward radial projection of said second insulating members.

4. An air gap winding rotating electric machine as claimed in claim 3, wherein each of said pairs of taper keys comprises a first taper key and a second taper key of similar shape.

5. An air gap winding rotating electric machine as claimed in claim 4, further comprising a projective sheet applied to each of said inward radial projections on the side facing one of said first taper keys.

6. An air gap winding rotating electric machine as claimed in claim 5, wherein said projective sheet is made of epoxy resin glass cloth laminate.

7. An air gap winding rotating electric machine as claimed in claim 6, further comprising a bearing liner applied between said protective sheet and said first taper key, and between said first taper key and said second taper key.

8. An air gap winding rotating electric machine as claimed in claim 7, wherein said bearing liner is made of a fluoroplastic.

* * * * *